(12) United States Patent
Wynne et al.

(10) Patent No.: US 8,397,026 B2
(45) Date of Patent: Mar. 12, 2013

(54) PARTITION ACCESS CONTROL SYSTEM AND METHOD FOR CONTROLLING PARTITION ACCESS

(75) Inventors: Michael J. Wynne, Woodlands (AU); Michael R. Geddes, Joondalup (AU)

(73) Assignee: Secure Systems Limited, Balcatta (AU)

( * ) Notice: Subject to any disclaimer, the term of this patent is extended or adjusted under 35 U.S.C. 154(b) by 295 days.

(21) Appl. No.: 10/591,385

(22) PCT Filed: Mar. 4, 2005

(86) PCT No.: PCT/AU2005/000317
§ 371 (c)(1), (2), (4) Date: May 31, 2007

(87) PCT Pub. No.: WO2005/086005
PCT Pub. Date: Sep. 15, 2005

(65) Prior Publication Data
US 2007/0300287 A1    Dec. 27, 2007

(30) Foreign Application Priority Data
Mar. 5, 2004    (AU) ................................ 2004901143

(51) Int. Cl.
*G06F 12/00* (2006.01)
*G06F 13/00* (2006.01)
*G06F 13/28* (2006.01)

(52) U.S. Cl. ........ 711/129; 711/111; 711/112; 711/115; 711/100; 711/163; 711/113; 711/152; 711/153; 711/147; 711/116; 713/165; 713/166; 713/167; 713/182; 726/26; 726/2; 726/21; 726/4; 726/6; 726/17; 707/785; 707/786

(58) Field of Classification Search ...................... 726/17
See application file for complete search history.

(56) References Cited

U.S. PATENT DOCUMENTS
5,163,147 A    11/1992    Orita
(Continued)

FOREIGN PATENT DOCUMENTS
GB    2281645    3/1995
JP    2002269092    9/2002
(Continued)

OTHER PUBLICATIONS
"Design and Implementation of TrustedBSD MAC Framework" by Robert Watson et al, IEEE publication, p. 1-12.
(Continued)

*Primary Examiner* — Nathan Flynn
*Assistant Examiner* — Bryan Wright
(74) *Attorney, Agent, or Firm* — Vidas, Arrett & Steinkraus, P.A.

(57) ABSTRACT

An access control system (10) is disclosed for controlling access to data stored on at least one data storage medium (14) of a computing system. The access control system (10) comprises authentication means (25) to authenticate users permitted to access data stored in the at least one data storage medium (14) and database means (29) arranged to store data access profiles. Each data access profile is associated with a user permitted to access data stored in the at least one data storage medium (14), each data access profile includes information indicative of the degree of access permitted by a user to data stored in the at least one data storage medium (14), and each data access profile includes a master data access profile (M) and a current data access profile (C). The current data access profile (C) is modifiable within parameters defined by the master data access profile (M).

19 Claims, 11 Drawing Sheets

U.S. PATENT DOCUMENTS

| | | | |
|---|---|---|---|
| 5,434,562 | A | 7/1995 | Reardon |
| 6,092,189 | A | 7/2000 | Fisher et al. |
| 6,134,549 | A | 10/2000 | Regnier et al. |
| 6,463,537 | B1 | 10/2002 | Tello |
| 2002/0178271 | A1* | 11/2002 | Graham et al. ............... 709/229 |
| 2004/0243772 | A1* | 12/2004 | Wissenbach ................... 711/152 |
| 2005/0050175 | A1* | 3/2005 | Fong et al. .................... 709/220 |
| 2005/0091522 | A1* | 4/2005 | Hearn et al. ................... 713/200 |
| 2007/0028292 | A1* | 2/2007 | Kabzinski et al. ................. 726/2 |

FOREIGN PATENT DOCUMENTS

| | | |
|---|---|---|
| JP | 2003296193 | 10/2003 |
| JP | 2003330622 | 11/2003 |
| WO | 01/29731 | 4/2001 |
| WO | 01/65375 | 9/2001 |
| WO | 02/19064 | 3/2002 |
| WO | 03/003242 | 1/2003 |
| WO | WO 03003242 A1 * | 1/2003 |
| WO | 03/100544 | 12/2003 |
| WO | 2004075049 | 9/2004 |

OTHER PUBLICATIONS

"Pointsec PC 4.3 Security Target" Version 1.08 Pointsec Mobile Technologies, Inc. (Prepared by SAIC) Publicshed Jan. 12, 2004. URL http://www.commoncriteriaportal.org/public/files/epfiles/ST_VID4010-ST.pdf Downloaded on May 25, 2005. Sections 6.1.X, particularly p. 45, p. 53 section 6.1.7.

Watson, R. et al. "Design and implementation of the Trusted BSD MAC Framework" DARPA Information Survivability Conference and Exposition 2003 Published Apr. 22-24, 2003.

* cited by examiner

Create Super User Account

| | |
|---|---|
| User Name | User 1 |
| New Password | ********** |
| Confirm Password | ********** |
| ☑ Enable | |
| Access Control Password | ********** |
| Confirm Access Control Password | ********** |
| Identity String | User 1 Profile |

[Finish]

Fig. 5

User Authentication

| | |
|---|---|
| User Name | |
| Pass Phrase | ********** |

[Authenticate]

PARTITION ACCESS CONTROL SYSTEM AND METHOD FOR CONTROLLING PARTITION ACCESS

CROSS-REFERENCE TO RELATED APLLICATIONS

Not applicable

STAMTEMENT REGARDING FERARALLY SPONSORED RESEARCH

Not applicable

FIELD OF THE INVENTION

The present invention relates to a partition access control system and method for computers that has particular utility for controlling user access to a data storage medium of a computing system.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND OF THE INVENTION

The following discussion of the background art is intended to facilitate an understanding of the present invention only. It should be appreciated that the discussion is not an acknowledgement or admission that any of the material referred to was part of the common general knowledge as at the priority date of the present application.

With widespread developments in computer networking technology and computer use generally, the security of computer systems and especially accessing of data on storage media by such systems, has become of paramount importance to prevent unauthorised access by users and programs such as viruses, worms and other types of malware.

It is known to provide an operating system wherein a degree of protection against unauthorised access is provided by defining access permission to data stored on a storage medium for each user, and requiring authentication of the users, for example using a user name and password, prior to authorising access to the storage medium.

However, such an arrangement provides only a minimal degree of protection against unauthorised access to data storage media.

It is known to provide a system and method for securing data and information stores in a computer system which involves the use of a discrete security device interposed between a host central processing unit (CPU) and a mass data storage medium of the computer system. The security device controls and coordinates access to the mass data storage medium based on pre-defined user access profiles.

It is also known to provide such a security device which is integrated into a bus bridge circuit provided on the motherboard of the computer system or into a bus bridge circuit provided in the hard disk drive itself.

With both arrangements, the security device under control of a system administrator is able to set data access permissions for partitions provided on the mass storage medium of the computer system and for each user of the computer system. The data access permissions include read only access, write only access, read and write access, or no access. In this specification, a set of data access permissions defined for a particular user is termed a "user access profile".

In order to ensure the integrity of the computer system incorporating the security device, the security device is configured to only authenticate users and assign user access profiles to users at start up of the computer system before loading the computer operating system. Modification of the user access profile for a particular user after loading the operating system is not possible.

However, while such an arrangement provides a high degree of security, the arrangement is relatively inconvenient to a user in the event that the user is assigned multiple access profiles for various circumstances, such as when connected or not connected to the Internet. In this instance, if the user is logged in according to an access profile which does not allow Internet access, in order to obtain Internet access the user would be required to shut down the operating system and adopt a different user profile appropriate for connecting to the Internet during the authentication stage of the start up process.

Such a process is inconvenient to a user of the system and can significantly detract from operation efficiency.

SUMMARY OF THE INVENTION

In accordance with a first aspect of the present invention, there is provided an access control system for controlling access to data stored on at least one data storage medium of a computer system, the access control system comprising:
 authentication means to authenticate users permitted to access data stored in the at least one data storage medium; and
 database means arranged to store data access profiles;
 each data access profile being associated with a user permitted to access data stored in the at least one data storage medium;
 each data access profile including information indicative of the degree of access permitted by a user to data stored in the at least one data storage medium; and
 each data access profile including a master data access profile and a current data access profile, the current data access profile being modifiable within parameters defined by the master data access profile.

In one arrangement, the access control system further comprises profile setting means arranged to facilitate creation of the master and current access profiles.

The access control system may be incorporated into a computing system having an operating system and the master data access profile may be modifiable only prior to loading of the operating system.

In one embodiment, the control system is activatable so as to permit modification of the current access profile and deactivatable so as to prevent modification of the current access profile.

The access control system may be implemented at least in part in the form of software.

In addition, or alternatively, the access control system may be implemented at least in part in the form of hardware.

In one embodiment, the access control system is arranged to govern user access profiles used by a security device configured to control access to a data storage medium. The security device may be implemented at least in part in hardware and may be of a type located between a data storage medium of a computing system and a CPU of the computing system. Alternatively, the security device may be implemented at least in part in hardware and may be of a type incorporated into bus bridge circuitry of a computing system.

In one arrangement, the access control system is incorporated into a computing system having an operating system and the current access profile is modifiable after loading of the operating system.

In accordance with a second aspect of the present invention, there is provided a method of controlling access to data stored on at least one data storage medium of a computing system, the method comprising the steps of:
- providing means for authenticating users permitted to access data stored in the at least one data storage medium;
- storing data access profiles;
- associating each data access profile with a user permitted to access data stored in the at least one data storage medium;
- each data access profile including information indicative of the degree of access permitted by a user to data stored in the at least one data storage medium; and
- each data access profile including a master data access profile and a current data access profile; and
- facilitating modification of the current data access profile within parameters defined by the master data access profile.

In accordance with a third aspect of the present invention, there is provided computer program which when loaded into a computing system causes the computing system to operate in accordance with an access control system for controlling access to data stored on at least one data storage medium of a computing system, the access control system comprising:
- authentication means to authenticate users permitted to access data stored in the at least one data storage medium; and
- database means arranged to store data access profiles;
- each data access profile being associated with a user permitted to access data stored in the at least one data storage medium;
- each data access profile including information indicative of the degree of access permitted by a user to data stored in the at least one data storage medium; and
- each data access profile including a master data access profile and a current data access profile, the current data access profile being modifiable within parameters defined by the master data access profile.

In accordance with a fourth aspect of the present invention, there is provided computer useable medium having a computer readable program code embodied therein for causing a computer to operate in accordance with an access control system for controlling access to data stored on at least one data storage medium of a computing system, the access control system comprising:
- authentication means to authenticate users permitted to access data stored in the at least one data storage medium; and
- database means arranged to store data access profiles;
- each data access profile being associated with a user permitted to access data stored in the at least one data storage medium;
- each data access profile including information indicative of the degree of access permitted by a user to data stored in the at least one data storage medium; and
- each data access profile including a master data access profile and a current data access profile, the current data access profile being modifiable within parameters defined by the master data access profile.

BRIEF DESCRIPTION OF THE DRAWINGS

The present invention will now be described with reference to the accompanying drawings, in which.

DESCRIPTION OF AN EMBODIMENT OF THE INVENTION

Referring to the drawings, there is shown a partition access control system implemented in this example in the form of a software application and configured so as to operate in association with a security device arranged to control and coordinate access to a mass data storage medium of a computing system.

However, while the present embodiment is described in relation to an access control system implemented in the form of software, it will be understood that other arrangements are possible. For example, the access control system may be implemented at least partially in hardware.

It will also be understood that the presence of a security device is not essential to the invention and other arrangements are possible. For example, the access control system in accordance with the present invention may be configured so as to operate in association with an appropriate access control application of an operating system.

The foregoing embodiments are directed towards an access control system arranged to control access by a user to a data storage medium, and which allows a user to modify a respective user data access profile within predefined parameters.

In the present embodiment, the computer system into which the access control system is incorporated is in the form of a standard personal computer (PC) comprising a central processing unit (CPU), standard peripheral devices such as monitor, keypad, mouse and printer, a data store in the form of a mass data storage medium such as a hard disk drive (HDD), and a security device (SDV) of the type described in patent specification WO 03/003242 for controlling and coordinating data access to the mass data storage medium.

As described in patent specification WO 03/003242, the SDV is interposed in the data access channel between the CPU and the HDD, and controls data access to the HDD by users. This control is effected using an authentication process, whereby a user having permission to access data on the HDD must be authenticated prior to booting of the PC operating system, and must be provided with a specific partition access profile that determines the data access permissions for the user in respect of the various partitions of the data storage medium. Furthermore, the SDV is designed to enforce the data access regime for each particular user authenticated by the system, to deny access to portions of the data storage medium in accordance with the partition access profiles, and to deny access by users that are not authenticated and/or by spurious processes.

As described, the authentication process is invoked during operation of the basic input output system (BIOS) after the "drive ID" check is performed, and the authentication program is run by the CPU on loading the "custom" boot sector provided by the SDV in place of the normal boot sector or master boot record normally stored in the data storage medium.

As described, it is only after a user has been properly authenticated and the processes undertaken by the user during operation of the authentication application program have been completed that the BIOS program proceeds with permitting access to the data storage medium and loading of the operating system under which the user may subsequently operate the computer and access the data storage medium in accordance with the relevant data access profile.

Figure 1:
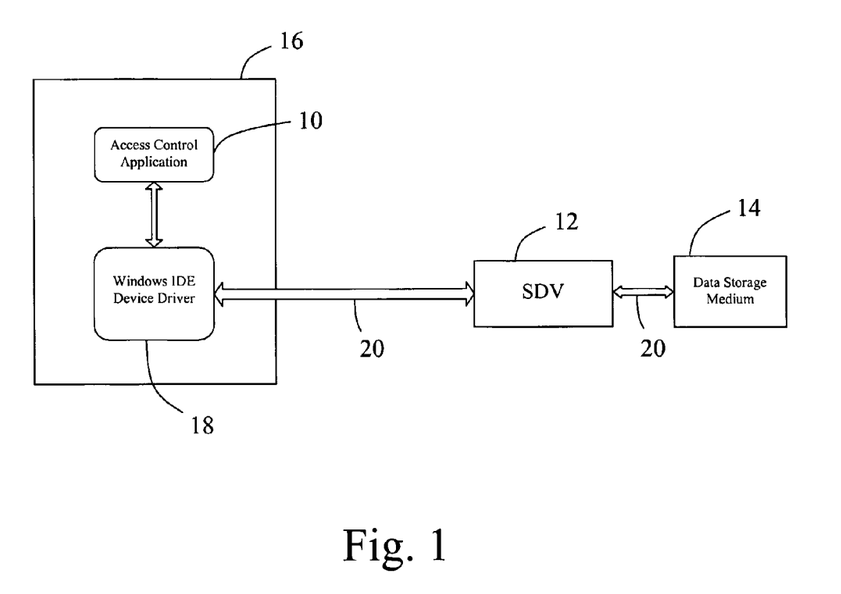
FIG. 1 is a block diagram showing a computing system including a partition access control system in accordance with a first embodiment of the invention, with the access control system shown in relation to a security device (SDV) of the type arranged to protect a computer system data storage medium.

As shown in FIG. 1, a partition access control system in accordance with the present embodiment is specifically configured to interact with a security device (SDV) 12 of the type described above. In the present example, the access control system is implemented in software as a partition access control application 10 and stored in a location in a data storage medium 14 of a PC.

In the present embodiment, the access control application 10 is written as a Windows program developed in VC++ and MFC to operate within a Windows operating system 16, although it will be understood that other arrangements are possible. The access control application 10 interfaces with a Windows IDE device driver 18 via a Windows Application Program Interface (API) and communicates with the data storage medium 14 along an IDE cable 20. As illustrated, the SDV 12 is connected in line with the IDE cable 20 so as to intercept all communications between the Windows IDE device driver 18 and the data storage medium 14.

The access control application 10 uses services provided by the Windows API of the host operating system, which may be Windows 2000 or Windows XP, for communicating with the SDV 12 and the user.

However, it will be appreciated that the access control application 10 may also be arranged to interface with other operating systems such as LINUX.

Figure 2:
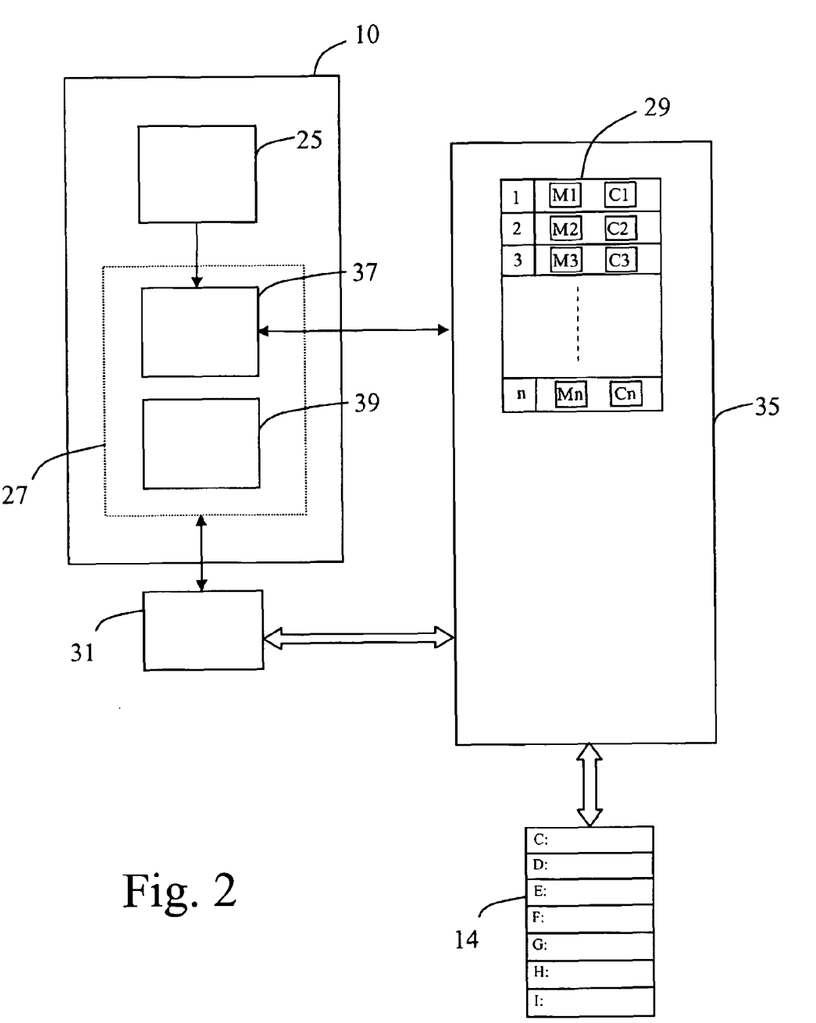
FIG. 2 is a block diagram of the logical structure of the access control system shown in FIG. 1 and an SDV interfaced with the access control system.

As shown in FIG. 2 of the drawings, the access control application 10 comprises logical processes in the form of an authenticator 25 and a control system engine 27, the control system engine 27 communicating with a database 29 which may form part of the SDV 12 or may form part of the data storage medium 14.

The access control application 10 is invoked to operate normally under operation of a CPU 31 of a PC under control of the operating system 16, and interacts with an SDV engine 35, the SDV engine 35 controlling data access between the CPU 31 and the data storage medium 14.

As previously described, the data storage medium 14 may comprise a one or more HDDs, each having one or more partitions. In the present embodiment, the drives/partitions are C:\, D:\, E:\, F:\, G:\, H:\ and I:\.

The control system engine 27 of the access control application 10 comprises a profile setter 37 and an editor 39 which are arranged to populate the database 29 in a prescribed manner. These components will be described in more detail later.

The database 29 is designed to logically store two types of data access profile for each user permitted access to the data storage medium 14 of the PC. The data access profiles include a master data access profile M1 to Mn for users 1 to n, and a current data access profile C1 to Cn. Each data access profile defines the data access permissions of a particular user for those partitions that the user is permitted to access.

Figure 3:
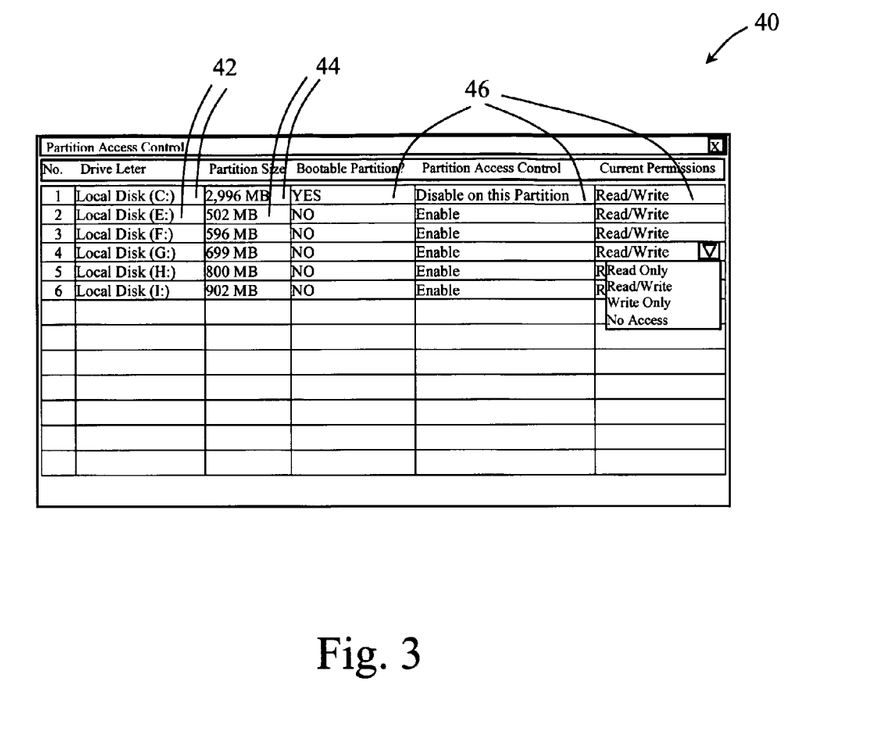
FIG. 3 is a depiction of a main screen displayed by a graphical user interface (GUI) of the access control system shown in FIGS. 1 and 2, the main screen showing partitions provided on the data storage medium of a computer system and the data access permissions available to a particular user of the computer system.

For example, as illustrated in FIG. 3, a user profile screen 40 is shown wherein a user associated with a user profile has access to six partitions 42 indicated by the drives C:\, E:\, F:\, G:\, H:\ and I:\, with the relevant partition size 44 indicated for each partition. Further details 46 indicating whether the partition is bootable, whether partition access control is enabled or disabled, and the current permissions applying to the particular partition or drive are also shown. As indicated in the "current permissions" column, several data access permissions are available for each partition, namely "read only", "write only" "read/write" and "no access".

The authenticator 25 of the access control application 10 functions separately to the authentication program of the SDV 12 and is provided to authenticate users permitted to se the access control application 10. As will be described in more detail later, the SDV 12 is configured so that an administrator or "super user" of the SDV 12 is permitted to configure data access profiles of users permitted to access the data storage medium 14 of the PC.

The authenticator 25 works in conjunction with the control system engine 27 and interacts with the database 29 via the SDV engine 35 to permit either super user access or normal user access to the access control application 10 with corresponding functionality applicable to the status of the user and the relevant master data access profile.

Each data access profile stored within the database 29 includes the following information:
>a user name and password for each permitted user,
>the partitions of the data storage medium to which the user is permitted access, and
>the permissions state for each partition to which the user is permitted access.

The various permissions states serve to define different degrees of data access to the data stored within each partition, including low or no permission, permission to read data from a partition, permission to write data to the partition, or total permission to read or write data from or to the partition.

In the present embodiment, the range of possible permissions is as follows:
No access—no permission to read or write data.
Read Only—no permission to write but permission to read.
Read/Write—total permission to read and write data.

The profile setter 37 is particularly designed to allow setting of a master data access profile and a current data access profile. The master data access profile effectively sets the scope within which a user may change or alter the user's current data access profile using the access control application 10.

The editor 39 may be invoked by either a super user or normal user of the access control application 10 in order to edit the master data access profile or the current data access profile of a user respectively. Thus, if a super user is identified by the authenticator 25, the control system engine 27 allows the super user to operate the editor 39 in a manner so as to access and vary the master data access profiles of any permitted user of the PC stored within the database 29. If the authenticator 25 authenticates a user as a normal permitted user, the control system engine 27 permits the editor 39 to be operated by the user in a manner so as to allow the current data access profile of the authenticated user to be modified within the parameters defined by the master data access profile previously determined for the user.

It will therefore be understood that the parameters defined by the master data access profile only permit modification of the data access permission for a partition to the same or a lower degree of data access. Importantly, the parameters defined by the master data access profile do not permit a user to modify the data access permission for a particular partition to a higher degree of data access than specified for the permitted user in the master data access profile.

By way of example, if the master data access profile 35 associated with a user specifies that the user has "read only" access for partition or drive E:\, then the user is only able to modify the current data access permission for drive E:\ to "no access". It is not possible to change the data access permission for drive E:\ to "read/write" access.

It follows that if the master data access profile associated with a user specifies that the user has "no access" to drive or partition E:\, the user would be denied from making any change to the current data access permissions for drive or partition E:\.

Thus the profile setter 37 only permits a current user data access profile to be passed to the SDV engine 35 for subsequent use by the SDV 12 that conforms with the parameters of the master data access profile of the user.

In order to obtain a better understanding of how the access control application 10 is configured for process flow and interaction with a user via a graphical user interface (GUI) provided as part of the Windows API, operation of the access control application will now be described in relation to FIGS. 4 to 13.

Figure 4:
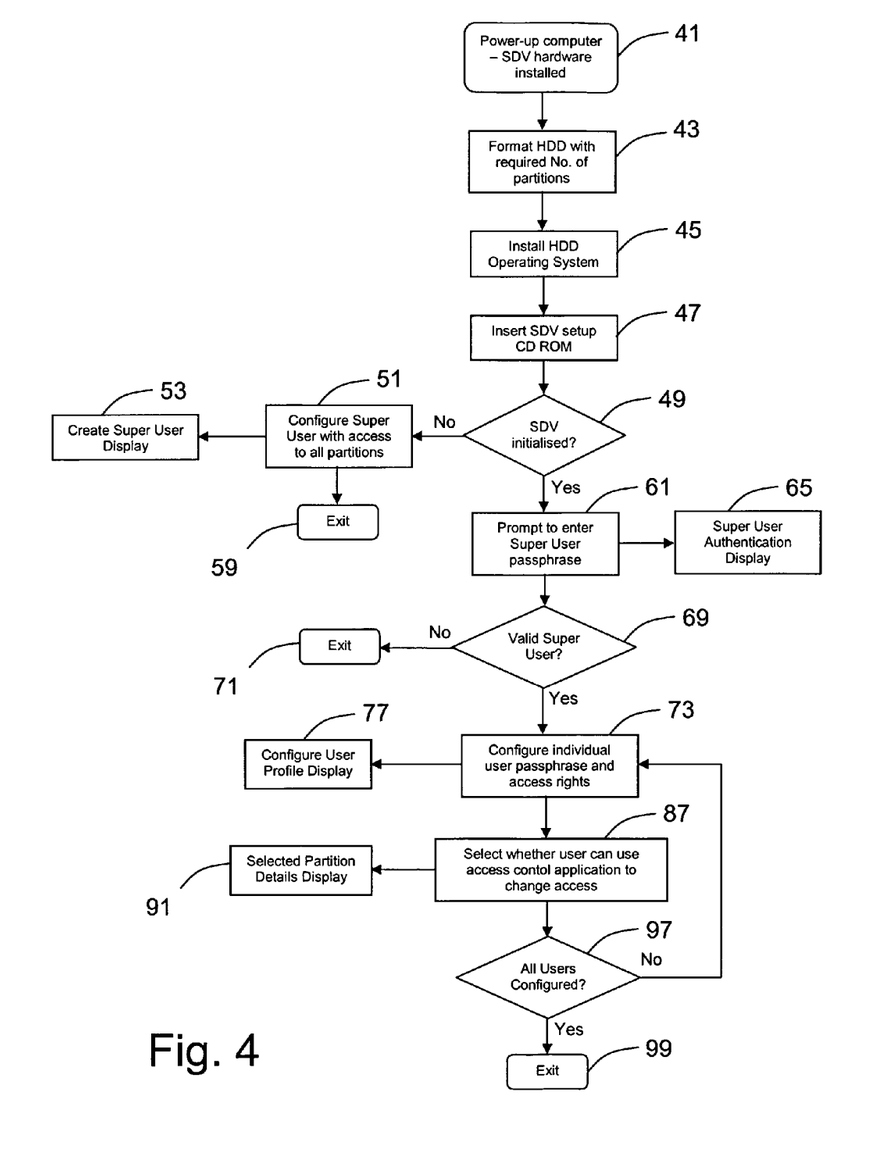
FIG. 4 is a flow diagram showing an initialisation process for a computer system incorporating the access control system shown in FIGS. 1 and 2 and an SDV.

The software flow performed by the SDV 12 during an initialisation phase is shown in FIG. 4.

Installing the SDV hardware 12 by connecting it in line with the IDE cable 20 between the CPU 31 and the data storage medium 14 is represented at 41. The HDD's of the data storage medium 14 are then formatted with the required number of partitions at 43, the HDD's are installed under the control of the operating system of the PC at 45. A CD ROM containing set up software for the SDV 12 is inserted into the CD ROM drive of the PC at 47 and the set up program is loaded under the control of the operating system 16.

Figure 5:
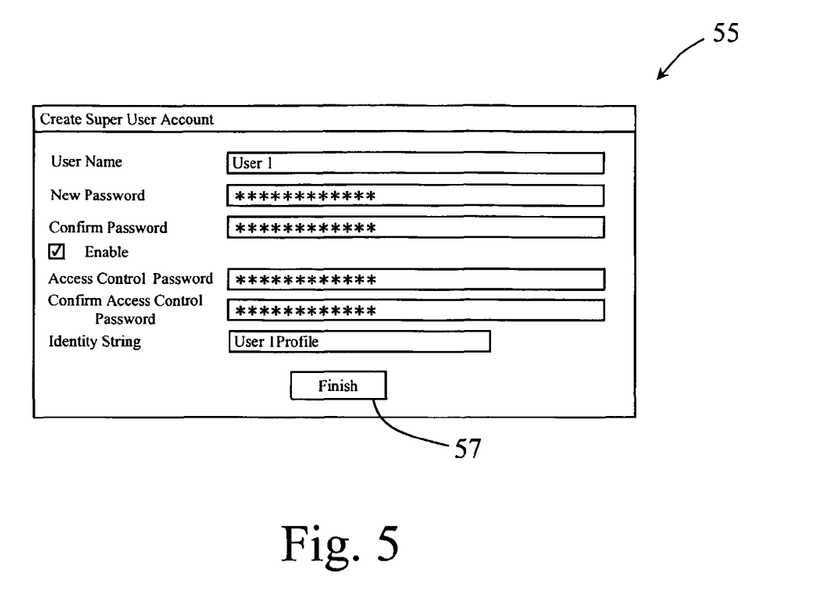
FIG. 5 is a panel displayed by the GUI in order for a "super user" to access the computer system including the access control system shown in FIGS. 1 and 2 and initialise user access profiles.

If the SDV 12 has not yet been initialised, the software flow at 49 invokes a process at 51 for setting up a super user for the SDV 12. The super user is able to set up user names and passwords for all permitted users of the PC and their associated master data access profiles. This process invokes a GUI at 53 to create a super user display panel 55 as shown in FIG. 5 of the drawings. The display panel 55 allows a super user name to be created and a password to be set for the super user. The display panel 55 also allows the super user to enable access control for permitted users of the PC if desired and set an access control password for the super user with confirmation of the access control password and an identity string to authenticate the super user when invoking the access control application 12. A "finish" button 57 is also provided at the bottom of the screen to allow the super user to exit the process at 59.

Once a super user account has been created, the SDV 12 is considered to be initialised and progresses to a user account configuration state, wherein the super user can set up individual user accounts for the users permitted access to the PC and to allow for their authentication.

Figure 6:
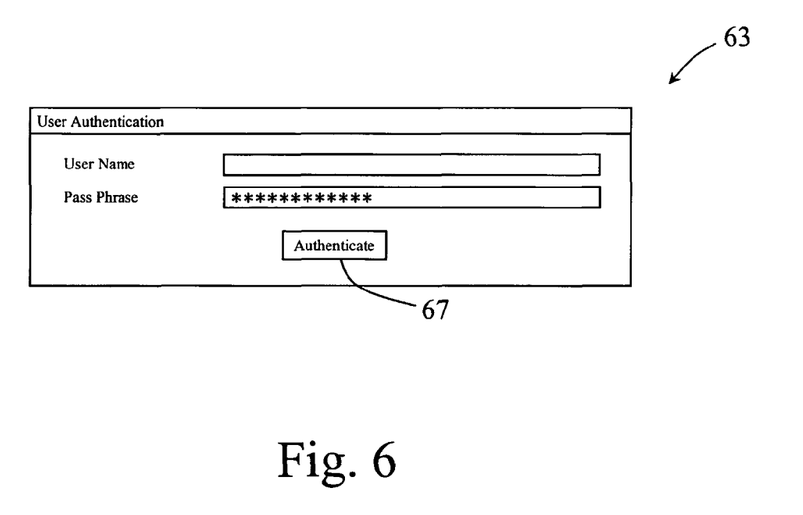
FIG. 6 is a panel displayed for the purposes of authenticating a "super user"

As shown, the software flow may proceed to super user configuration of user accounts commencing at step 61 either immediately after the setup of the super user via the exit process 59, or via the decision box 49 if the SDV 12 has previously been initialised. The process commences at 61 by displaying a user authentication panel 63, as shown at FIG. 6 of the drawings, and prompting the super user to enter their user name and pass phrase for correct authentication at 65. An authenticate button 67 is provided on the display panel 63 to effect authentication at 69. If a super user is not authenticated at this stage, the program flow exits at 71 and the setup program for the SDV 12 needs to be restarted and the process repeated until such time as a super user is authenticated.

On valid authentication at 69, the software invokes a process at 73 that allows a super user to create each individual user account, assigning individual user pass phrases and access rights to configure the master data access profiles for the individual users.

Figure 7:
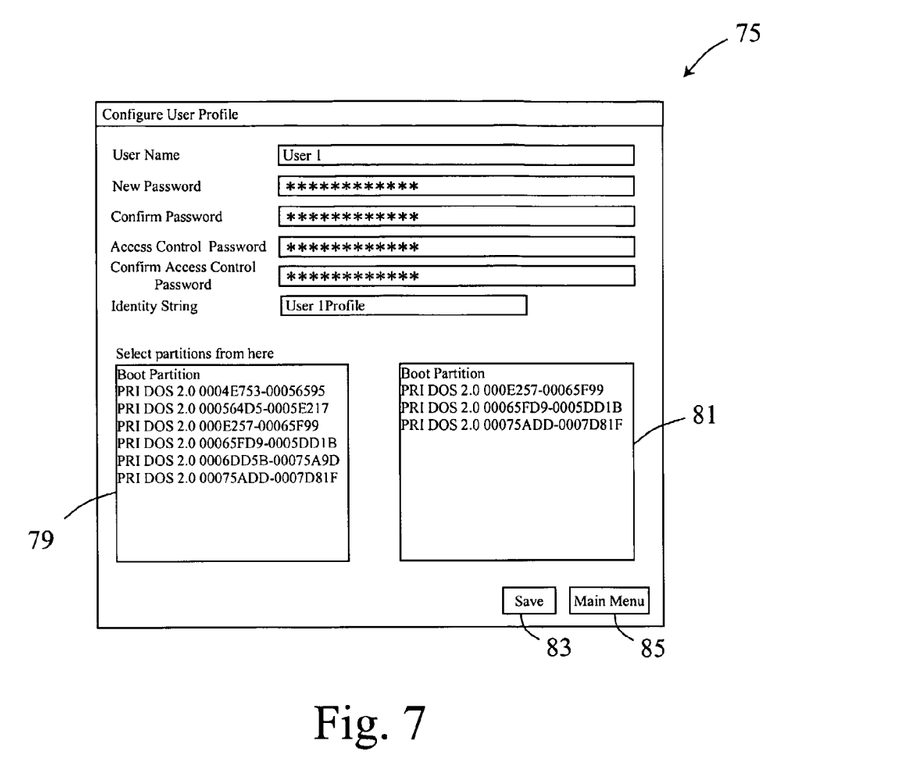
FIG. 7 is a panel displayed to a "super user" for the purpose of configuring a user access profile.

This process uses a display panel 75 as shown in FIG. 7 to configure each individual user profile at 77. The display panel 75 includes data entry fields for a user name, password, password confirmation, access control password, access control password confirmation and an identity string. The display panel 75 also includes two partition panels, a first partition panel 79 listing the various partitions formatted on the HDD of the data storage medium 14 and a second partition panel 81 the partitions that have been selected by the super user for access by a particular user.

As shown in FIG. 7, the partition name and memory address map is provided for each formatted and selected partition. A "save" button 83 and a "return to main menu" button 85 are provided at the bottom of the display panel 75 to save the configuration and return to normal program flow respectively.

Figure 8:
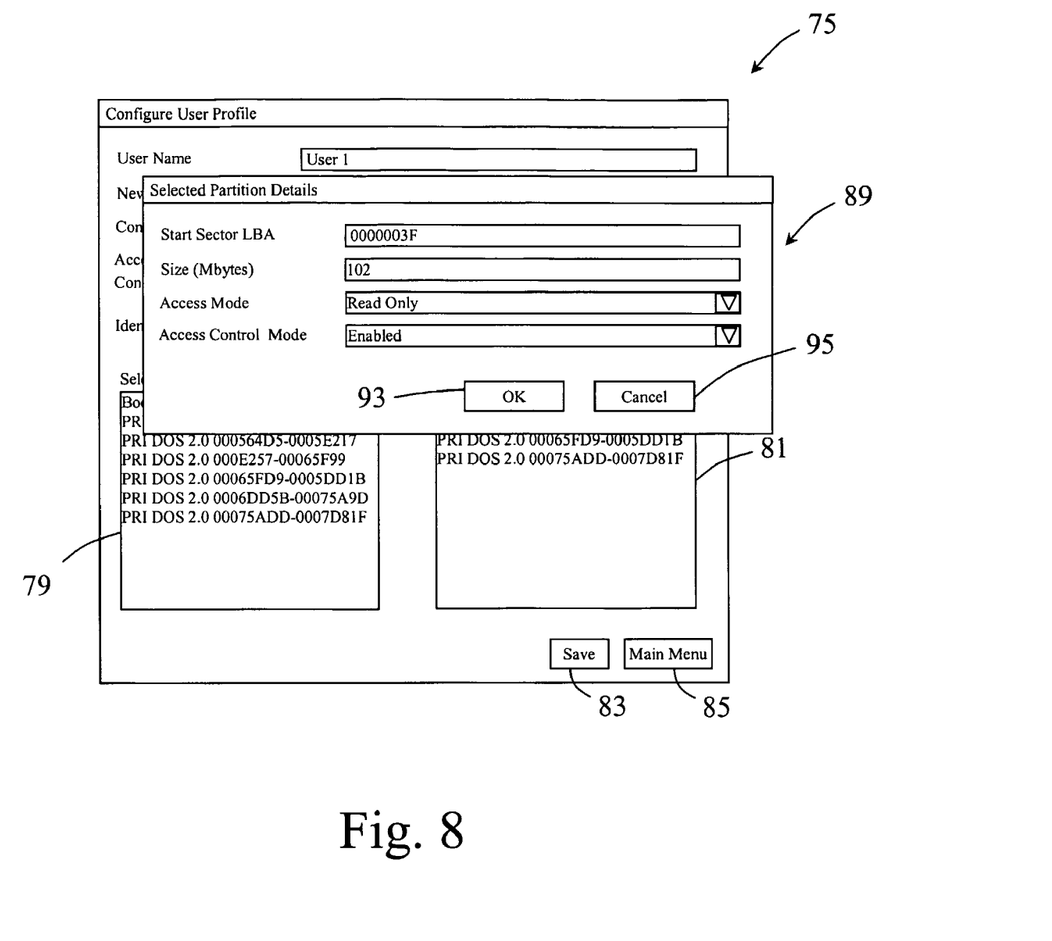
FIG. 8 is a panel superimposed upon the display panel of FIG. 7 for the purpose of defining data access permissions for a specific partition during configuration of a user profile.

In order to select partition access, permissions and access control accessibility for individual users, a process 87 is invoked which causes the GUI to show a display panel 89 superimposed on the user profile configuration panel 77 as shown in FIG. 8.

The display panel 89 allows the start sector address, the partition size, access mode and setting of the access control mode for the particular partition access of the user to be identified. As indicated, drop down menus are provided for "access mode" and "access control mode" entry fields to allow selection of fixed permission access modes, i.e. read only, read/write and no access, for the purposes of setting the access mode, and "enabling" or "disabling" flags for the access control mode respectively. An "ok" button 93 and a "cancel" button 95 are provided at the bottom of the display panel 91 to allow for completion of the partition details selection of the highlighted partition.

After each user profile configuration has been completed, a check is made as to whether the super user has configured all users at 97 and, if not, the user profile configuration step 73 is carried out for another user. If profile configuration of all users has been completed, the initialisation procedure stops, as indicated at step 99.

Figure 9:
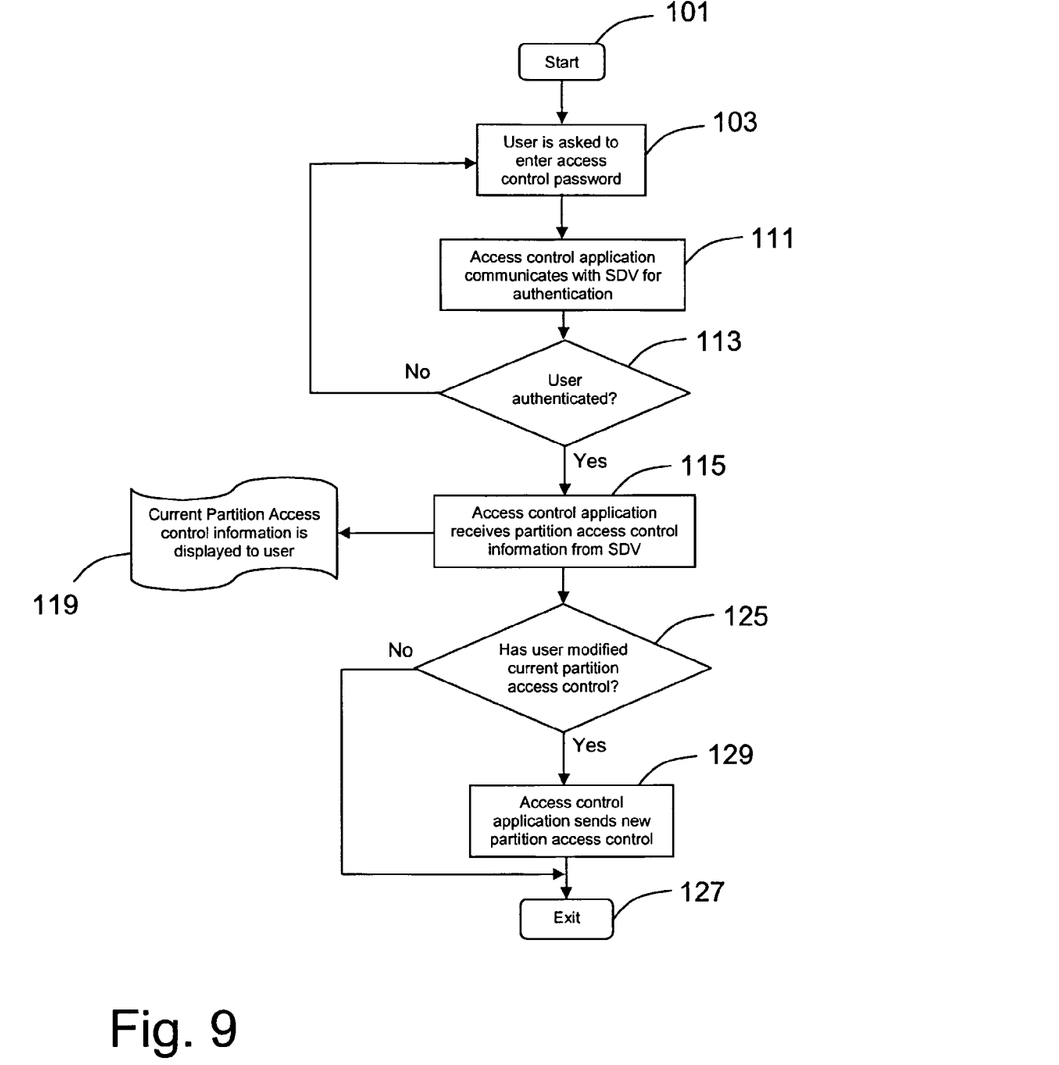
FIG. 9 is a flow diagram showing the logical processes performed by a user when invoking the access control system.

As previously described, in the present example the access control application 10 operates as an application under the operating system 16 and interfaces with the Windows API to communicate with a user and the SDV engine 35. The software flow of the access control application 10 is shown in FIG. 9.

Figure 10:
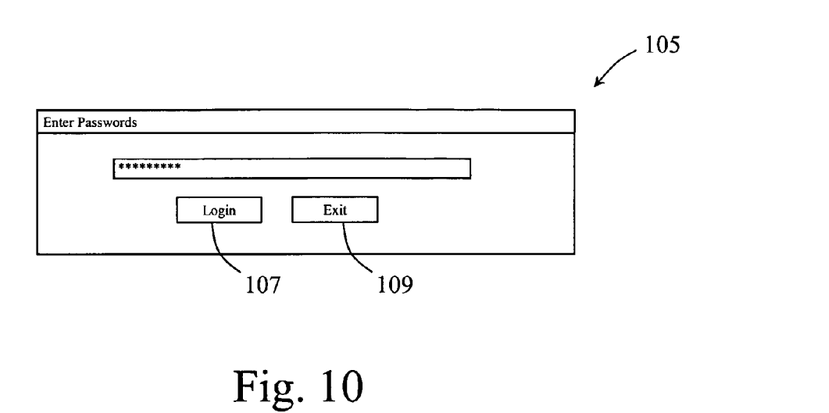
FIG. 10 shows a password entry box for authenticating a user to access the access control system.

The access control application 10 is invoked by a user at 101 and a password entry display panel 105 as shown in FIG. 10 is displayed. The display panel 105 is used to enter the relevant access control password for user authentication.

The display panel 105 includes a "login" button 107 and an "exit" button 109 to continue or exit the access control authentication process. If continued by pressing the "login" button 107, the access control application 10 communicates with the SDV 12 for authentication at 111, whereupon verification of the authentication occurs at 113. If the user is not authenticated, the user is asked to enter the relevant access control password at 103. If the user is authenticated, the process continues and the control system engine 27 retrieves the partition access control information from the SDV 11 at 115.

Figure 11:
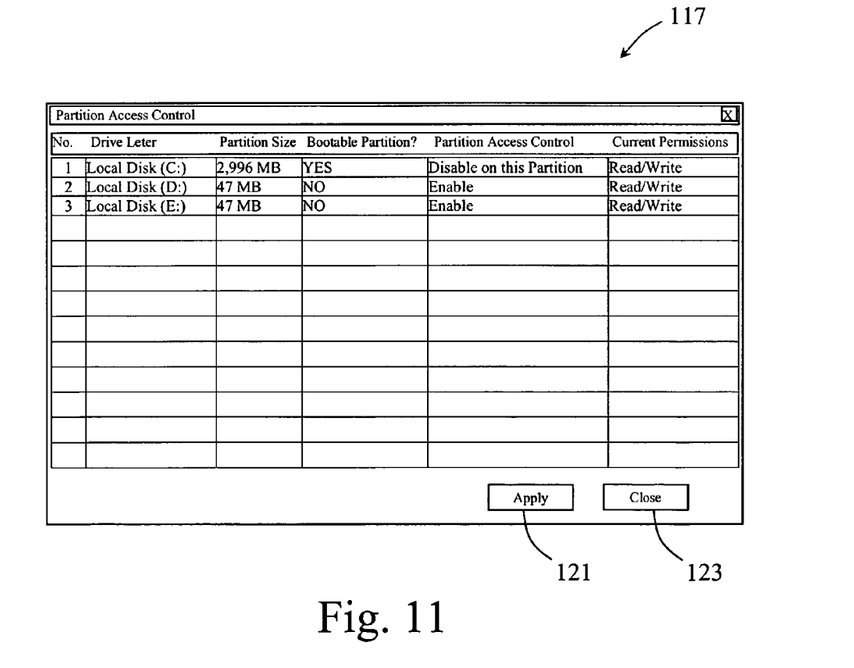
FIG. 11 shows a partition access control table for a user authenticated to use the access control system.

The partition access control information for the authenticated user is then displayed to the user in the form of a table 117 as shown in FIG. 11. The table 117 corresponds to the table described previously at FIG. 3 of the drawings and only those partitions to which the user has been allocated access by the super user are displayed. The user is provided with the option to modify the permissions specified in the table to the extent permitted by the profile setter 37, that is, the degree of data access can be reduced or reasserted under the "current permissions" column in accordance with the master access profile. This is effected by clicking on the particular entry of the "current permissions", whereupon a drop down menu is presented providing the available permissions that are selectable for the particular drive are within the bounds of control determined by the master data access profile previously set for the user by the super user.

An "apply" button 121 and a "close" button 123 are provided at the base of the display panel 117 so that software flow may be progressed at 125. Moreover, if a user has not modified any partition access control and the "close" button 123 is asserted, then the access control application 10 is exited directly at 127. If the user has modified the current permissions and applied them by asserting the "apply" button 121, then the profile setter 37 sends new partition access control information to the SDV 12 at 129 so that the relevant current data access profile stored in the database 29 is modified as appropriate.

Figure 12:
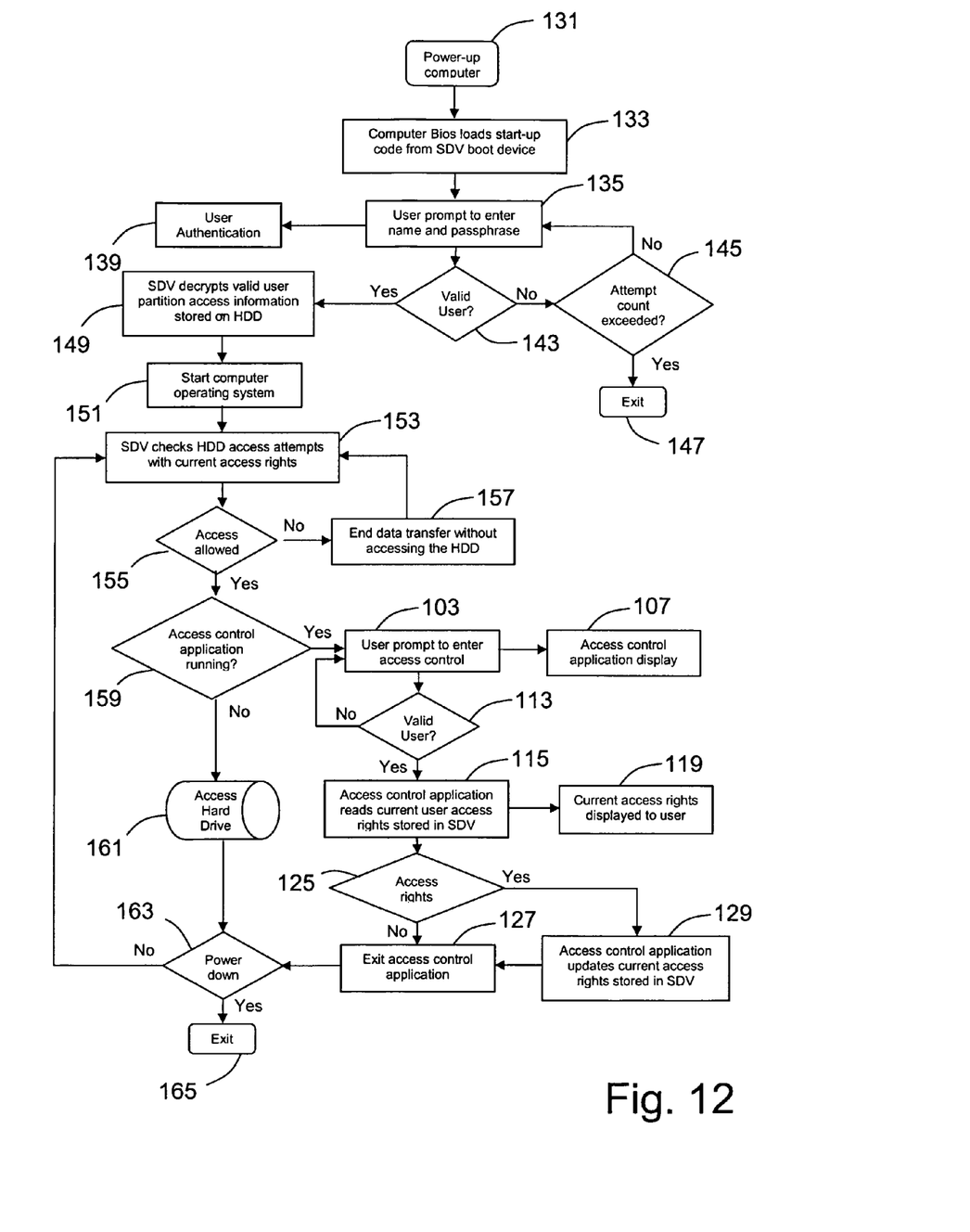
FIG. 12 is a flow diagram showing normal system operation of a computer system incorporating SDV and access control system process flows.

The integration of the normal software flow of the access control application, in conjunction with normal SDV system operation, is shown at FIG. 12. Like steps are indicated with like reference numerals.

During normal operation of the SDV 12 and the access control application 10, the PC is powered up at 131 and the computer BIOS invoked which subsequently loads the start-up code from the SDV boot device at 133.

Figure 13:
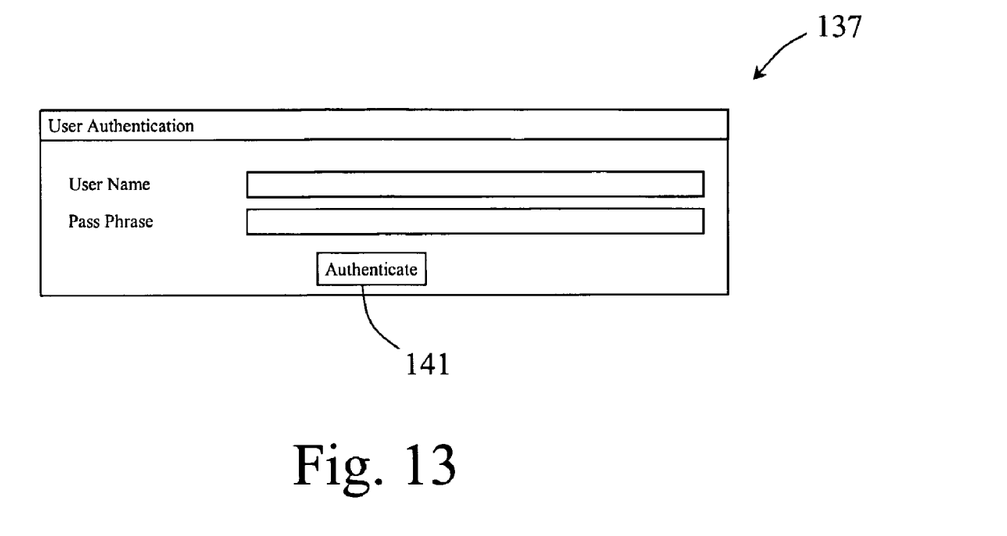
FIG. 13 shows a user authentication box displayed to a typical user during authentication of the user to the SDV prior to booting of the operating system.

The user is prompted at 135 to enter the relevant name and pass phrase via the user authentication display panel 137 which is displayed to the user by the GUI at 139. On pressing the "authenticate" button 141 provided at the bottom of the display panel 137, the SDV authentication process is invoked to authenticate whether the user is a permitted user of the computer system.

If the user is not authenticated at 143, then an attempt counter is incremented (or decremented) and the permitted number of authentication attempts checked at 145. If the number of permitted authentication attempts are exceeded, the software process is exited at 147 and the computer system shutdown. If the number of permitted attempts to authenticate the user has not yet been reached, then the software flow returns to prompting the user to enter the relevant name and pass phrase at 135 to provide the user with another authentication attempt.

On authentication of the user at 143, the SDV 12 decrypts the valid user partition access information, which in the present embodiment is stored in the database 29 in a hidden area of memory at 149, to control subsequent data access to the data store in accordance with the current user profile configured for the permitted user.

The computer operating system 16 is then started at 151, whereupon the SDV 12 checks all subsequent data access attempts to the data storage medium 14 at 153 in accordance with the current data access profile of the permitted user. If a data access attempt at 155 is not in accordance with the current data access profile of the user, then the data transfer process, being either a "read" or "write" is blocked at 157, without any access to the HDD being effected. The SDV 12 then returns to its data checking state at 153.

If data access is in conformity with the current data access profile of the user at 155, then the data is checked to ascertain wether the access control application is being invoked at 159. If not, data access to the HDD of the data store 15 is continued at 161, and the power down condition checked at 163. If the power down condition is asserted at 163, the software flow is exited at 165 and the power down process is effected by the computer system. If the power down condition is not asserted, then the software flow returns the SDV 12 to its data checking at 153.

If at 159 the SDV 12 determines that the access control application 10 is invoked, then the access control software flow process as described with respect to FIG. 9 is progressed.

If the user has valid access to the access control application 10, the access control application 10 reads the partition access control information stored in the database 29 at 115, and displays the current data access profile of the user at 119.

If the user modifies the relevant access rights at 125 using the editor 39 then the access control application 10 updates the current data access rights stored in the database 29 of the SDV using the profile setter 37 at 129, and proceeds to exit the access control application 10 at 127. Alternatively, if access rights are not modified at 125, then the access control application exits at 127 directly. On exiting the access control application 10, the power down condition is again checked at 163 and, if asserted, the program flow is exited at 165. If not asserted, the software flow returns the SDV 12 to its data checking state at 153.

In an alternative embodiment, an SDV 12 incorporated into the design of a bus bridge circuit is provided, either in the south bridge of the motherboard on the CPU side of the computer system or, alternatively, in the bridge circuit provided on the data store side, in the case of using a serial AT attachment (SATA) standard for communicating with the data store, as described in the applicant's international patent specification accompanying International Application PCT/AU2004/000210.

It will be appreciated that the control system described in either of the above embodiments allows an authenticated user to change the read and/or write access control partitions for which the user has authorisation during normal system operation under the operating system, without the need to change the user profile during a pre-boot process. Thus, the access control application 10 is installed as standard application software on the hard disk of a computer system and runs under the control of an operating system.

In this manner, only one master data access profile is required for each user, with each master data access profile defining the data access permissions for each partition accessible to the user and enabling access to the partitions within the confines of the master data access profile. This means that it is possible to obtain complete control over data access that is allowed for the partitions by permitted users, whilst allowing each permitted user to alter their own profile within prescribed parameters governed by the master data access profile.

A further alternative embodiment of the invention may take the form of an access control application which performs all access control functions in relation to a data storage medium, or which operates in conjunction with an operating system instead of in conjunction with a security device such as the SDV described above. With this arrangement, permission or denial of access to drives and/or partitions will be exercised by the operating system within the confines of the master and current data access profiles controlled by the access control application.

A still further embodiment of the invention may take the form of a hardware implemented access control system which is connectable to a computing system and which includes appropriate software to cause the access control system to operate in conjunction with an operating system, an SDV type security device, or any other appropriate access control arrangement.

Some of the advantages provided by the present invention in allowing partition access control to a permitted user within limits as determined by the system administrator or super user are as follows:

The system administrator has complete control over the users and partitions which may be controlled by the access control application.

Each user requires only one profile for authentication at start-up.

The number of passwords a user must remember are minimised.

In order to protect data on the data store, a user may alter read or write access permissions for those partitions within their permitted bounds of control at any time during normal system operation.

A user may disable access to all partitions allowing them to leave the computer in a secure state, without turning the power off. A third party must know the permitted users password to be able to gain access to the disabled partitions.

The access control application can be distributed on CD or downloaded from a website provided on the Internet.

The access control application can be stored in an encrypted "read only" partition on the HDD to help maintain system integrity.

Where methods and systems of the present invention may be implemented by software applications, or partly implemented by software, then they may take the form of program code stored or available from computer readable media, such as CD-ROMS or any other machine readable media, the program code comprising instructions which, when loaded into a machine such as a computer, the machine then becomes a system for carrying out the invention.

It should be appreciated that the present invention is not limited to the specific embodiments described herein. Accordingly, alternative embodiments and variations from the best mode may be envisaged in accordance with conventional software and computer engineering practice, without departing from the spirit or scope of the present invention. The above disclosure is intended to be illustrative and not exhaustive. This description will suggest many variations and alternatives to one of ordinary skill in this art. All these alternatives and variations are intended to be included within the scope of the claims where the term "comprisin" means "including, but not limited to". Those familiar with the art may recognize other equivaltents to the specific embodiments described herein which equivalents are also intended to be encompassed by the claims.

Further, the particular features presented in the dependent claims can be combined with each other in oter manners within the scope of the invention such that the invention should be recognized as also specifically directed to other embodiments having any other possible combination of the features of the dependent claims. For instance, for purposes of claim publication, and dependent claim which follows should be taken as alternatively written in a multiple dependent form from all prior claims which possess all antecedents referenced in such dependent claim if such mulitlple dependent format is a accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed:

1. An access control system for controlling access to data stored on at least one data storage medium of a computing system, the access control system comprising:

authentication means to authenticate users permitted to access data stored in the at least one data storage medium, the authentication means authenticating users as a super user or a normal user; and a database arranged to store a master data access profile and a current data access profile for each user permitted to access data stored in the at least one data storage medium;

wherein each current data access profile includes information indicative of the degree of access permitted by the user associated with the current data access profile to data stored in the at least one data storage medium and the access control system controls access to the data storage medium in accordance with the current data access profile;

wherein each master data access profile includes information indicative of the scope within which the current access profile associated with the master access profile may be modified;

wherein the master data access profile is modifiable by a super user but not by a normal user, and wherein if a user is authenticated as a normal user, the current data access profile of the first user is modifiable by the user within the scope defined by the master data access profile.

2. An access control system as claimed in claim 1, further comprising profile setting means arranged to facilitate creation of the master and current access profiles.

3. An access control system as claimed in claim 1, wherein said access control system is activatable so as to permit modification of the current access profile and deactivatable so as to prevent modification of the current access profile.

4. An access control system as claimed in claim 1, wherein the access control system is implemented at least in part in the form of software.

5. An access control system as claimed in claim 1, wherein the access control system is implemented at least in part in the form of hardware.

6. An access control system as claimed in claim 2, wherein the access control system is arranged to govern user access profiles used by a security device configured to control access to a data storage medium.

7. An access control system as claimed in claim 6, wherein the security device is implemented at least in part in hardware and is of a type located between a data storage medium of a computing system and a CPU of the computing system.

8. An access control system as claimed in claim 6, wherein the security device is implemented at least in part in hardware and is of a type incorporated into bus bridge circuitry of a computing system.

9. An access control system as claimed in claim 1, wherein the access control system is incorporated into a computing system having an operating system and the current access profile is modifiable after loading of the operating system.

10. A method of controlling access to data stored on at least one data storage medium of a computing system using an access control system, the method comprising the steps of:
configuring a current data access profile and a master data access profile for each user permitted to access said data, wherein the current data access profile includes information indicative of the degree of access permitted by the user and the master data access profile includes information indicative of the scope within which the current access profile associated with the master access profile may be modified;
storing the master data access profile and the current data access profile for each user in a database of the access control system;
authenticating a first user as a super user or a normal user;
controlling access to the data storage medium in accordance with the current data access profile, and
wherein, if a user is authenticated as a normal user, the current data access profile of the user is modifiable by the user within the scope defined by the master data access profile of the user, wherein the master data access profile is modifiable by a super user but not by a normal user.

11. A method as claimed in claim 10, further including the steps of activating said access control system to permit modification of the current access profile and deactivating said access control system to prevent modification of the current access profile.

12. A method as claimed in claim 10, wherein the access control system is implemented at least in part in the form of software.

13. A method as claimed in claim 10, wherein the access control system is implemented at least in part in the form of hardware.

14. A method as claimed in claim 10, further comprising the step of arranging the access control system so as to govern user access profiles used by a security device configured to control access to a data storage medium.

15. A method as claimed in claim 14, wherein the security device is implemented at least in part in hardware and is of a type located between a data storage medium of a computing system and a CPU of the computing system.

16. A method as claimed in claim 14, wherein the security device is implemented at least in part in hardware and is of a type incorporated into bus bridge circuitry of a computing system.

17. A method as claimed in claim 10, wherein the computing system has an operating system and the current access profile is modifiable after loading of the operating system.

18. A non-transitory computer readable medium storing a computer program which when loaded into a computing system causes the computing system to operate in accordance with an access control system for controlling access to data stored on at least one data storage medium of a computing system, the access control system comprising:
authentication means to authenticate users permitted to access data stored in the at least one data storage medium, the authentication means authenticating users as a super user or a normal user; and
a database arranged to store a master data access profile and a current data access profile for each user permitted to access data stored in the at least one data storage medium;
wherein each current data access profile includes information indicative of the degree of access permitted by the user associated with the current data access profile to data stored in the at least one data storage medium and the access control system controls access to the data storage medium in accordance with the current data access profile;
wherein each master data access profile information indicative of the scope within which the current access profile associated with the master access profile may be modified;
wherein the master data access profile is modifiable by a super user but not a normal user; and
wherein if a user is authenticated as a normal user, the current data access profile of the first user is modifiable by the user within the scope defined by the master data access profile.

19. A non-transitory computer readable medium having a program code embodied therein for causing a computer to operate in accordance with an access control system for controlling access to data stored on at least one data storage medium of a computing system, the access control system comprising:
authentication means to authenticate users permitted to access data stored in the at least one data storage medium, the authentication means authenticating users as a super user or a normal user; and
a database arranged to store a master data access profile and a current data access profile for each user permitted to access data stored in the at least one data storage medium;
wherein each current data access profile includes information indicative of the degree of access permitted by the user associated with the current data access profile to data stored in the at least one data storage medium and the access control system controls access to the data storage medium in accordance with the current data access profile;
wherein each master data access profile information indicative of the scope within which the current access profile associated with the master access profile may be modified;
wherein the master data access profile is modifiable by a super user but not a normal user; and
wherein if a user is authenticated as a normal user, the current data access profile of the first user is modifiable by the user within the scope defined by the master data access profile.

* * * * *